July 27, 1965 M. S. WELCH 3,196,547
MACHINIST'S GAUGING DEVICES
Filed Feb. 26, 1962 3 Sheets-Sheet 1

INVENTOR.
MYLES S. WELCH
BY
Christie, Parker & Hale
ATTORNEYS.

July 27, 1965    M. S. WELCH    3,196,547
MACHINIST'S GAUGING DEVICES
Filed Feb. 26, 1962    3 Sheets-Sheet 2
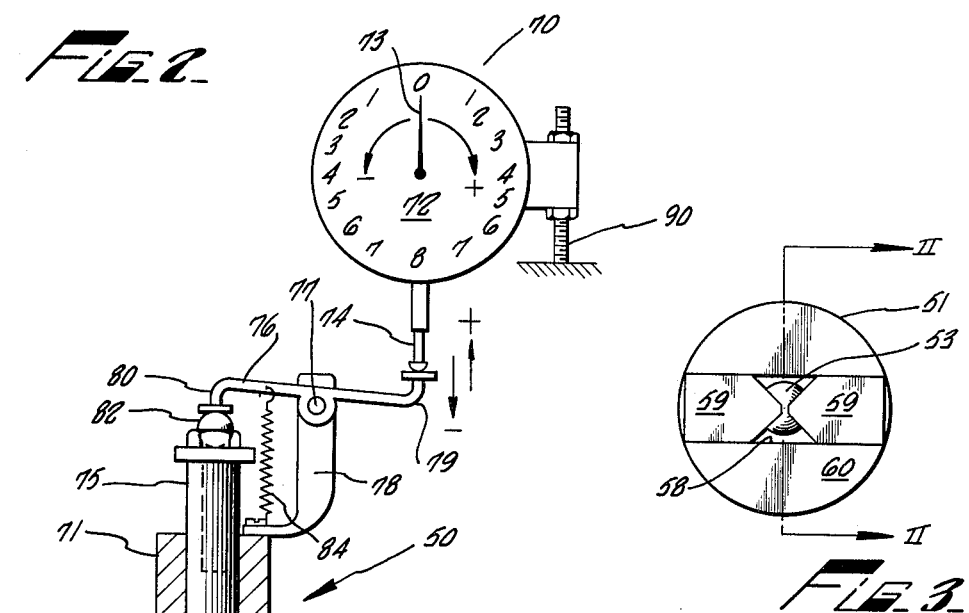
*Fig. 2*
*Fig. 3*
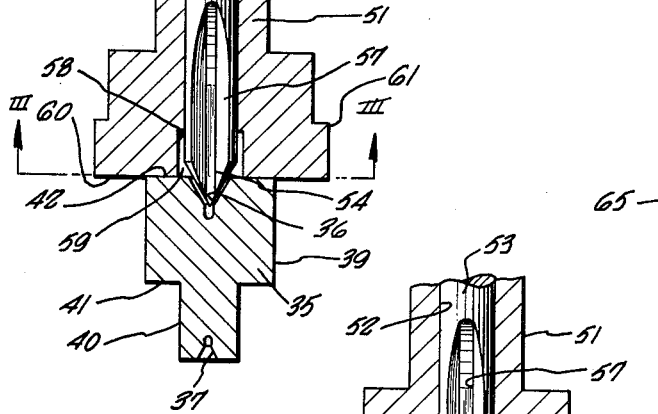
*Fig. 4*
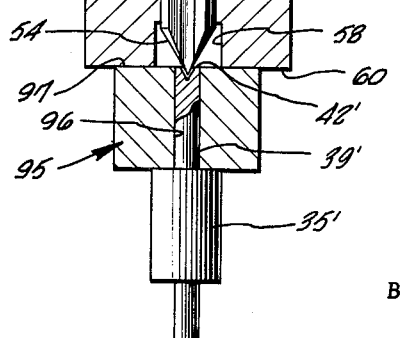
*Fig. 5*
INVENTOR.
MYLES S. WELCH
BY
Christie, Parker & Hale
ATTORNEYS.

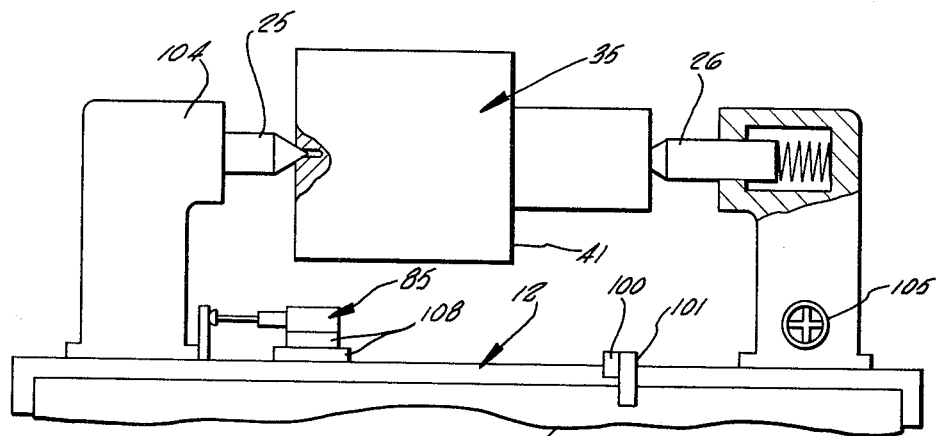
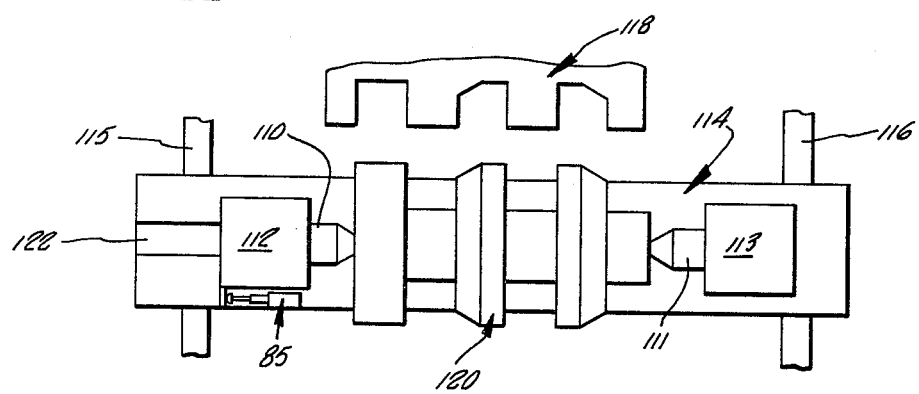
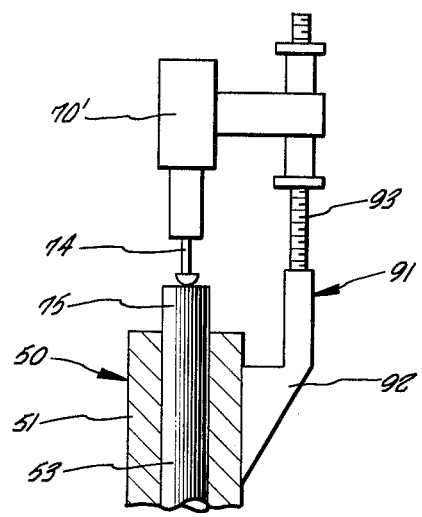

United States Patent Office 3,196,547
Patented July 27, 1965

3,196,547
MACHINIST'S GAUGING DEVICES
Myles S. Welch, 511 E. Maple, Glendale, Calif.
Filed Feb. 26, 1962, Ser. No. 175,768
3 Claims. (Cl. 33—169)

This invention relates to method and apparatus for improved accuracy and economy in gauging a workpiece for a machining operation. More particularly, the invention relates to method and apparatus for determining the size of a center hole on a workpiece relative to a standard, and for locating the workpiece in a machine tool in a position determined in relation to the variation of the center hole character from the standard.

This invention finds particular utility in machining operations where a workpiece is held in position relative to the working part of the machine tool by conical centers engaged within conical, coaxially aligned holes or cavities formed at opposite ends of the workpiece. This method of supporting the workpiece in the machine tool is common in, for example, lathes, grinding machines, and polishing machines.

The normal terminology utilized in conjunction with such mounting of a workpiece denotes a head center and a tail center. The head center is mounted in a housing which is in fixed position relative to the carriage of the machine. The tail center is mounted in a housing which normally is fixed in a preselected position relative to the carriage. The tail center however may be spring loaded within its mounting. The centers per se are substantially cylindrical, coaxially aligned and spaced apart members having conical ends; the apexes of the cones are disposed toward one another. It is standard in the machine tool industry to maintain the interior angle of these cones at 60°. The sides of the center holes formed in the opposite ends of the workpiece, and engagable with the head and tail center cones, define a 60° angle.

For the purposes of illustration and explanation of this invention, a shoulder grinding operation is selected as exemplary of the principals involved in this invention. In grinding a shoulder on a workpiece, as opposed to the process of machining a cylindrical surface—as on a lathe, it is normally the practice to locate the finished surface of the shoulder a preselected and predetermined distance from a reference point on the machine tool carriage. The carriage is movable relative to the bed or base of the grinding machine. A pair of stops, disposed between the carriage and the bed, are positioned so that the stops are engaged when a preselected point of the workpiece, corresponding to the location of the finished shoulder, is engaged with the grinding wheel. When the carriage traverses an amount sufficient to bring the preselected workpiece point against the side of the grinding wheel, the mechanical stops between the carriage and the bed engage so that no further carriage travel occurs. In this manner it is assured that the part is not ground undersize on the linear dimension by having the preselected point of the workpiece travel past the active surface of the grinding wheel. The procedure outlined above is standard in a rough grinding operation. However, in a fine or finish grinding procedure, or in a grinding procedure on small precision parts, the foregoing method cannot be utilized because other factors inject sources of error into the machining operation.

In the precision grinding of small workpieces in quantity, it has been found that one large source of error is the variation in center hole depth. These variations are most significant when say an end to shoulder length tolerance is to be met in the finished workpiece.

Most shoulder grinding operations require, for simplest procedures, that the head center be positioned at a certain location relative to the grinding wheel. For example, assume that a 1.000 (+.000/−.002) inch length dimension is to be held between a shoulder to be ground and the headstock end of the workpiece. If all center holes at the headstock end of the workpiece were identical it would be possible to set the grinder with limit stops so that an entire production run may be ground with ease.

But as mentioned above it is rare that the center holes are drilled uniformly. If a center hole is too deep, the part rides high upon the head center and the part is ground oversize. If the center hole is too shallow, the part rides out at the end of the head center and the part is ground undersize and must be scrapped. Normally, in the precision grinding operation the materials worked upon are of a costly nature and scrapping of any part materially effects the cost of the finished product of those acceptable.

Because of this problem, it is conventional for each part in a precision shoulder grinding operation to be individually micrometered or gauged. A grinding step is made and the part is removed from between the head and tail centers. The part is gauged to determine the dimensions and the disparity between the required dimensions and the present dimensions is noted. The part is reinserted into the machine and the remaining material is ground off. This procedure requires extensive manual labor and is time consuming.

The invention is based upon the utilization of a gauge part having the proper finished length dimension. The center hole character of the gauge part is arbitrarily taken as a norm or standard to which the other parts in the production run or series will be referenced. The grinder is set up with the gauge part and a surface gauge mounted to one of a pair of relatively movable machine parts is zeroed for the gauge part relative to a limit stop mounted to the other relatively movable part. The other parts to be machined are run through the comparator of this invention and the difference in depth of the center hole at the headstock end of each subsequent part relative to the norm is noted by a second surface gauge. The surface gauge on the machine is then utilized to properly set the machine for each subsequent part prior to the grinding thereof. Once each part is put into the machine, it is not removed until finished correctly. The result is that each part need be inserted into the machine tool only once. This reduces the manual labor involved and improves the accuracy of the grinding operation. This directly contributes to reducing the cost of the final product.

Generally speaking, the apparatus of this invention comprises a center hole comparator for use with machine tools. These machine tools have a pair of spaced apart coaxially oriented conical tipped centers for supporting a workpiece therebetween during an operation on the workpiece by the machine tool. The comparator comprises a sleeve defining a vertical bore therethrough. A rod is disposed within the bore in close slidable fit relative to this sleeve. The lower end of the rod defines a conical tip conforming to the standard configuration of a head center and also to the configuration of a standard center hole tap or drill. A rod guide and workpiece abutting means is disposed at the lower end of the sleeve and surrounds the rod. The lower end of the rod projects through the guide and abutting means. A first precision distance measuring means or surface gauge is mounted at the upper end of the sleeve and is operatively connected with the upper end of the rod to accurately and precisely reflect a position of the lower end of the rod relative to the workpiece abutting means. The distance measuring means mounted to the sleeve indicates the depth of a center hole in a workpiece engaged with the conical rod tip and abutting the work piece abutting means or surface. A second precision distance measuring means is mounted between the carriage and the bed of the machine tool. The indication of the first distance measuring means is correlated to a setting of the second distance measuring means to preset the machine tool for the variation of the workpiece center hole relative to a standard center hole. Thereafter, limit stops located on the machine tool may be used to automatically govern the machine operation.

In terms of method this invention comprises selecting a workpiece from a plurality of similar workpieces. This selected workpiece becomes the standard for subsequent items in a production run. The machine tool is set to the positions requisite to providing ideal tolerances on the selected standard part. The head center hole of the selected standard part is gauged and adopted as a norm to which the center holes of subsequent parts will be compared. The method further includes measuring the head center holes on subsequent parts of the production run and referencing or comparing the dimensions of the center hole taps to the norm. The divergence between each subsequent part and the norm is noted and an adjustment in the position of the carriage of the machine tool relative to a preselected location on the base of the machine tool corresponding to the standard is made prior to insertion of each subsequent workpiece into the machine tool for operation by the machine tool.

These and other objects and features of the invention will be better understood from the following detailed description and explanation of this invention taken in conjunction with the following drawings, wherein:

FIGURE 2 is a cross-sectional view with parts shown in elevation of the comparator;

FIGURE 3 is an end view of the lower end of the comparator as taken along line III—III of FIGURE 2;

FIGURE 4 is an illustration, similar to FIGURE 3, of alternate apparatus for guiding the gauge rod;

FIGURE 5 is a cross-sectional view of the comparator as used in conjunction with a workpiece having a small headstock end;

FIGURE 6 is an elevational view of an alternate form of the comparator;

FIGURE 7 is an elevational view of an alternate method of using the invention; and FIGURE 8 is a plan view of a bench or inspection installation utilizing the comparator.

Figure 1:
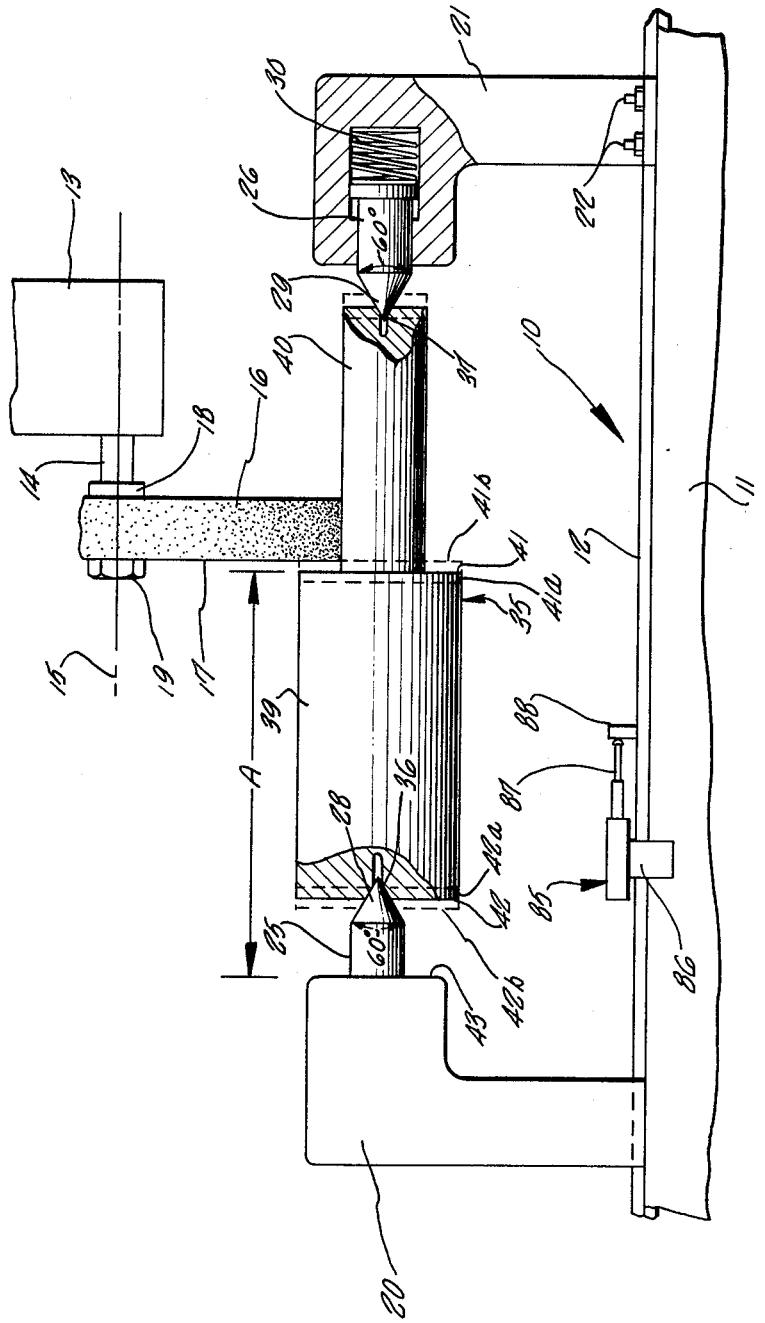
FIGURE 1 is a fragmentary elevational view of a workpiece mounted between the head and tail centers of a conventional grinding machine.

FIGURE 1 illustrates a grinding machine 10 having a base 11 and a carriage 12 movable longitudinally of the base 11. (The carriage 12 is reciprocable laterally relative to base 11 as viewed in FIGURE 1.) The grinding machine 10 further includes a grinding head 13 fixed relative to the base 11. A rotary shaft 14 extends from the grinding head 13 and has its axis 15 oriented parallel to the line of reciprocation of the carriage 12. A grinding wheel 16 having an active surface 17 is secured to the cantilevered end of shaft 14 by a collar 18 and nut 19 combination.

A headstock 20 and a tailstock 21 are mounted to the carriage 12 for reciprocation therewith relative to the base 11 and grinding head 13. Preferably the tailstock 21 is securable in fixed relation to the carriage by means of nuts 22. Each stock 20 and 21 mounts a work support center 25 and 26, respectively. The head center 25 mounted in headstock 20 is secured in fixed relation to the headstock 20 and projects from the headstock toward the tailstock 21. The free unsupported end of the head center 25 terminates in a conical end 28. The angle of the diametrically opposed rays or elements of the cone 28 converge at an angle of 60°. The tail center 26 is coaxial with the headstock 25 and terminates in an unsupported, conically configured end 29 having a similarly angled cone of 60°. The 60° angle present in the head center and tail center points is in accord with a standard which is substantially international. The tail center 26 preferably is resiliently mounted relative to the tailstock 21 by a spring 30 engaged between the inner end of the tail center and the tailstock.

A workpiece 35 is disposed between the head and tail centers 25 and 26, respectively. The workpiece 35 has a pair of spaced apart, coaxially aligned, conical center holes 36 and 37 formed in the headstock and tailstock ends, respectively. The tips 28 and 29 of the head and tailstocks 25 and 26 are engaged within these holes 36 and 37 and position the workpiece relative to the respective stocks 20 and 21.

For the purposes of illustration, the workpiece 35 is shown to comprise two barrel portions 39 and 40 defining a shoulder 41 therebetween. In FIGURE 1 the barrel 39 has an enlarged diameter with respect to the barrel 40. The shoulder 41 is the surface to be ground by the active surface 17 of grinding wheel 16. In the example of FIGURE 1, let it be assumed that the distance between shoulder 41 and the headstock end 42 of the workpiece 35 is to be ground to a dimension of 1.000 inch and is to be held to a close tolerance ranging between .002 inch undersize and .000 inch oversize.

As mentioned above, the conventional procedure in rough grinding or in the grinding of large parts is to utilize limit stops engaged between the carriage and the base of the machine tool. This is permissible since in rough grinding it is not required to observe tolerances of the precision character assumed above. In the case of precision grinding, however, while extreme care may be taken by the operator of the grinding machine to assure that the carriage is not traversed at greater distance relative to the base than is desired, still the entire operation, if dependent upon limit stops, may result in error solely because of a divergence in the dimensions of the center holes between one production part and another.

Where limit stops are utilized between the carriage 12 and base 11 of the machine tool 10, the stops are positioned so that when they engage they terminate relative travel between the carriage and base, a predetermined location of the workpiece 35 is then in engagement with the grinding wheel 17. This predetermined location, in the example assumed above, corresponds to the desired location of the finished shoulder 41. In order to effect such an operation it is assumed that the distance between shoulder 41 and end 42 of the workpiece will be the exact desired distance. It is also necessary to assume that the distance between the shoulder 41 and the end surface 43 of headstock 20 is a constant distance. This implies that the distance between end 42 of workpiece 35 and headstock surface 43 must be constant. If this latter distance were not constant, then the limit stop approach would not be accurate and the part would be ground undersize or oversize.

In actuality the distance between the headstock surface 43 and the headstock end 42 of the workpiece 35 varies because the depth of the headstock center hole 36 varies. In a large batch of workpieces on a single job order there is a slight variation in the depth of the headstock center holes between different parts of the batch. Because of this variation the distance between the headstock end 42 of the workpiece 35 and the headstock surface 43 varies. It is acknowledged that this variation is generally of a small nature, but in precision grinding operations this small variation is sufficient to render the limit stop method of operation impractical. To illustrate, if the workpiece 35 has too shallow a headstock center hole, the workpiece rides far out on the end of the head center 25. This condition is illustrated by the dot-dash lines 41ᵃ–42ᵃ of FIGURE 1, meaning that the desired location of the shoulder 41 is moved to the right. In this case, were only the limit stops utilized, the workpiece would be ground undersize since the limit stops would be set to correspond to dimension A. On the other hand, if the workpiece center hole 36 were formed too deeply, the workpiece would ride far up on the head center 25. (This corresponds to the dashed lines 41ᵇ–42ᵇ of FIGURE 1.) In this situation the workpiece would be ground oversize since limit stops would provide that the carriage would cease traversing motion before the desired location of the workpiece were brought into engagement with the active surface 17 of grinding wheel 16.

Referring to FIGURE 2 the center hole comparator 50 of this invention is illustrated. The comparator comprises a sleeve 51 having a central vertical bore 52 in which is engaged a slidable sensing rod 53. The diametral tolerance between the bore 52 and the cylindrical body of rod 53 is such that the rod 53 slides slowly downwardly through the sleeve 51 by virtue of its own weight. The lower end 54 of rod 53 is formed in a conical point having an apex angle of 60° to correspond to the angle of the standard head or tail center and to the standard center hole 36. A pair of radially disposed flute recesses 57 are formed in the rod 53 adjacent to the lower end of 54 and extend longitudinally upwardly of the rod partially along its length.

A transverse slot 58 is formed in the lower end surface of sleeve 51. A pair of pointed plugs or rod retainers 59 are engaged within slot 58. The points of the plugs 59 conform to the cross-section of the flutes 57 and are engaged within the flutes. The engagement between the plugs 59 and the flutes 57 is of a clearance conforming to that of the rod 53 within the bore 52 permitting the rod 53 to reciprocate relative to the sleeve 51 so that the conical lower end 54 may depend below the lower end surface 60 of the sleeve 51. The plugs 59 are preferably sintered or brazed into position relative to the sleeve 51 and serve to retain the rod within the sleeve 52 when the upper ends of the flutes engage the plugs 59. Alternately, the plugs 59 may be dovetailed into the groove 58 and retained therein by a peripheral band 61 around the lower portion of the sleeve 51. As illustrated in FIGURE 2 the lower surface 60 of the sleeve 51 is perpendicular to the axis of the bore 52 and to the axis to the rod 53. The surface 60, together with the coplanar surfaces of plugs 59, forms a workpiece abutment surface.

FIGURE 4 illustrates an alternative form of the rod flute configuration. In this case four, rather than two, flutes 63 are formed in the lower end of the rod 53 and define four perpendicular knife edged webs 64 converging toward one another at an angle of 60°. As in the embodiment shown in FIGURE 3, plugs 65 are sintered into the lower end of the sleeve 51 such that they normally may not be removed or tampered with to impair the accuracy of the apparatus.

A precision distance measuring means 70 is mounted adjacent the upper end 71 of the sleeve 51. This measuring means 70 is a spring-loaded plunger-type surface gauge having a radial face 72 and a pointer 73. Pointer 73 revolves clockwise as plunger 74 is moved toward the face 72, and revolves counterclockwise as the plunger 74 moves away from the distance measuring means 70. As illustrated in FIGURE 2 the surface gauge 70 is operably connected to the upper end 75 of the sensing rod 53 by a pivoted lever arm 76. The lever arm is pivoted at 77 to a bracket 78 secured in fixed relation to the upper end 71 of sleeve 51. The pivot arm 76 has a plunger engaging end 79 and a sensing rod engaging end 80. The distance between pivot point 77 and the engagement between arm end 79 and plunger 74 is exactly equal to the distance between pivot 77 and the sensing rod end 80. To assure that constant dimensions are maintained between end 79 and pivot point 77, a ball 82 is mounted to the upper end of sensing rod 53 and engages the end 80 of the pivot rod 76. To assure that the pivot arm 76 exactly maintains contact with the sensing rod 53, a spring 84 is connected between the pivot arm 76 and the pivot arm mounting bracket 78. Spring 84 has a tension value sufficient to override the effect of the spring biasing gauge plunger 74.

Referring to FIGURE 1, a second distance measuring means 85 is mounted to a pedestal 86 which is secured to the base 11 of the grinding machine 10. The plunger 87 of the second surface measuring means is engageable with a stop or post 88 secured to the movable carriage 12. The distance measuring means 85 preferably is a surface gauge of the type illustrated in FIGURE 2. For the proper practice of this invention, it is preferable that the first and second surface gauges 70 and 85, respectively, be matched so that their performance is as close to one another as possible. The second surface gauge 85 may be located in any portion of the grinding machine 10; it is not necessary that it be positioned as illustrated in FIGURE 1. It is only necessary that it cooperate between the fixed and movable bed and carriage of the grinding machine.

In the operation of the comparator 50 during the grinding of a large number of workpieces 35, each of which may have a different headstock center hole 36 characteristic, the first step, as mentioned above, is the arbitrary selection of any one of the workpieces in the batch as a standard part. This arbitrarily selected standard part is carefully machined to the exact dimensions required in the job order. Consistent with the foregoing assumption, the particular operation required is the grinding of the shoulder 41 to be positioned at a distance of 1.000 (+.000/−.002) inch from the headstock end 42 of the workpiece. When the grinding operation on the standard part is completed, the shoulder 41 is engaged with the active face 17 of the grinding wheel 16. With these faces engaged, the second surface gauge 85 and the stop 88 are adjusted so that the second surface gauge manifests a zero reading. The arbitrarily chosen standard part is then removed from the grinding machine 10 and is positioned with its headstock end 42 engaged with the horizontal planar surface 60 of comparator 50. In this position the conical tip 54 of the sensing rod 53 is engaged within the headstock center hole 36 of the standard work piece. The first surface gauge 70 is then adjusted vertically by means of the screw 90 until the indication of the first surface gauge 70 is at zero as illustrated in FIGURE 2. This completes the preliminary zeroing or presetting of the comparator 50.

Subsequent workpieces 35 in the production run regulated by this particular job order are then engaged with the comparator 50 before being inserted between the centers 25 and 26 on the grinding machine 10. Each of these subsequent workpieces is positioned so that the headstock ends 42 firmly engage the planar surface 60 of the comparator with the conical lower end 54 of the sensing rod engaged within the center hole 36.

Assume that the first subsequent workpiece so engaged with the comparator has a center hole 36 which is deeper than the center hole of the standard part. This means that the sensing rod 53 will move downwardly with respect to sleeve 51 a greater distance than the rod 53 moves when engaged with the standard part. The pivot arm 76 therefore will be displaced in a counterclockwise direction such that the plunger 74 will be moved in a positive direction to provide clockwise rotation of the pointer 73 on the first surface gauge 70. The reading of the first surface gauge 70 is noted. Assume further that the surface gauge 70 reads "3" in the clockwise direction. The first subsequent part is then inserted between the machine tool centers 25 and 26. In order to insert the workpiece between the centers 25 and 26 it may be necessary to move the carriage to the left, as viewed in FIGURE 1, to clear grinding wheel 16. It may be necessary to swing the second surface gauge 85 out of the way to permit this initial adjustment. In such a case, the second surface gauge 85 is affixed to a mounting permitting such movement of the surface gauge, but assuring that the second surface gauge 85 is returned to its initial position.

Once the subsequent workpiece 35 has been mounted between the centers 25 and 26 and engaged with the grinding wheel the surface gauge 85 is reestablished in contact with the stop 88. The grinding operation then continues until the second surface gauge 85 indicates the same reading as was observed upon the first surface gauge 70 for this particular workpiece. When the reading of the second surface gauge 85 corresponds exactly to the reading observed on the first surface gauge 70 (i.e., +3) the grinding operation is terminated. At this point the workpiece has been ground to the exact dimension initially produced on the arbitrarily assumed standard part.

It was assumed that the first workpiece ground after selection of the arbitrary standard had an oversize center hole. As described above, if the conventional limit stop method had been utilized to regulate the grinding operation, the part would have been ground oversize since the headstock end 42 of the workpiece would have assumed the dashed-line position of FIGURE 1.

For the purposes of illustration, assume that the second workpiece after selection of the arbitrary standard has an undersize headstock center hole 36. As mentioned above, if the conventional limit stop were to be utilized, this particular part would be ground undersize. When the center hole 36 is too shallow, the upper end of the sensing rod 53 is at a higher elevation than with the standard part and, accordingly, the plunger 74 of the first surface gauge depresses or retracts to produce a counterclockwise or negative reading. The value of this negative reading is transferred to the second surface gauge 85 and the grinding operation proceeds according to the manner described in connection with the first subsequent workpiece.

An alternate method of utilizing the comparator 50 exists in conjunction with the conventional limit stop method of regulating the traversing function of the grinder 10 and is shown in FIGURE 7. In this case a pair of limit stops 100 and 101 are engaged between the carriage 12 and the base 11 of the grinder 10. The tailstock mounting tail center 26 is adjustable along carriage 12 by a finely threaded feed screw operated by a hand wheel 105; such feed screw is conventional in lathes, grinders, and the like and is not illustrated since it forms no part of the structure or method of the present invention. The second surface gauge 85 supplied with comparator 50 is mounted directly to the carriage 12. The arbitrarily chosen workpiece, constituting the standard part for the particular plurality of similar workpieces, is machined to the ideal tolerance condition. With the shoulder 41 engaged with the active surface of a grinding wheel, the second surface gauge 85 is positioned so that its plunger 87 prependicularly abuts a point of the headstock 104. The second surface gauge 85 is affixed to a mounting 108 which permits movement of the surface gauge longitudinally of the carriage 12. The surface gauge is zeroed relative to the headstock 104, that is, the position of the second surface gauge 85 is varied with respect to carriage 12 until the pointer of the gauge indicates zero. When this adjustment has been obtained the surface gauge 85 is secured in fixed relation to the carraige 12 by locking the adjustable mounting thereof.

The operation of the comparator 50 in conjunction with subsequent workpieces is according to the procedure described above. When a variation of a center hole from the norm associated with the standard part has been ascertained, the headstock 104 is adjusted relative to the carriage 12. This adjustment is continued until the second surface gauge exhibits a reading identical in value and sign to the reading of the first surface gauge 70 obtained for the particular subsequent workpiece. The operation of the grinding machine 10 may then be automatically regulated until the limit stops 100 and 101 engage and terminate the traversing function of grinder 10.

In the apparatus described, pivot arm 76 is utilized to provide that a positive reading on the first surface gauge 70 corresponds to a positive reading on the second surface gauge 85. The use of the pivot arm 76 may be eliminated if the mechanism of the first surface gauge 70 is reversed with respect to the second surface gauge. In other words the first surface gauge $70^1$ should provide a positive reading upon extension of the plunger while the second surface gauge 85 should provide a positive reading upon retraction or compression of plunger 87. The mounting 91 of such a modified first surface gauge $70^1$ is illustrated in FIGURE 6. Mounting 91 comprises a bracket 92 affixed to the upper end of sleeve 51 and an adjustment post 93 on the bracket 92 engaged with gauge $70^1$. It is necessary in such a case, however, that the first surface gauge $70^1$ be adjustable along the axis of the sensing rod 53 to facilitate initial setting of the first surface gauge $70^1$. Such is provided by post 93.

It is possible that a surface gauge having a mechanism working exactly like that of surface gauge 85 may be utilized in conjunction with the embodiment of the invention illustrated in FIGURE 6. In this case, however, one surface gauge would read negatively while the other would read positively. Such a phenomenon means that in order to properly utilize the invention, the operator of the grinding machine 10 would have to continually remember that this transposition of aboslute value existed. It is felt, however, that it is most desirable to eliminate as many sources of error as possible. Accordingly this invention prefers the use of a comparator wherein the sign of the first surface gauge corresponds to the sign of the second surface gauge.

In the apparatus described above, the magnitude of each reading of the first and second surface gauge 70 and 85, respectively, may vary with the requirements of the particular grinding operations as utilized. However, to be consistent with the assumed example mentioned above it is preferable that the first and second surface gauges read in ten thousandths of an inch.

In order to properly utilize this invention care must be taken that the headstock end surface 42 of each workpiece flushly and closely abuts the precision ground surface 60 of sleeve 51 adjacent the conical tip of the sensing rod 53. Misalignment of the workpiece when mating with the surface 60 may provide sources of error in the use of the comparator since the conical point 54 of the sensing rod 53 will not completely engage with the center hole 36 of the workpiece to accurately sense the depth thereof. With workpieces having a substantial diameter at the headstock end 42 no appreciable problem from misalignment with the sensing rod 53 normally exists. However, when the diameter of the headstock end 42 of the workpiece is of a nominal or very small value, then sources of error may easily arise due to the misalignment of the axis of the workpiece with the axis of the sensing rod. This is particularly true in view of the pointed nature of the plugs 59 engageable within the flutes 57 of the sensing rod 53 (see FIGURE 3). One method of reducing the possibility of misalignment of the workpiece in the sensing rod is to utilize the flute 63 and plug 65 configuration illustrated in FIGURE 4. This configuration provides more area of surface 60 adjacent to the tip of the sensing rod for abutment with the surface 42.

FIGURE 5 illustrates a workpiece $35^1$ having a reduced diameter headstock end portion $39^1$. Accordingly, the diameter of the headstock end surface $42^1$ is very much reduced with respect to the illustrations of FIGURES 1 and 2. To assure that the workpiece $35^1$ is properly aligned with the axis of sensing rod 53, such that surface $42^1$ is parallel to surface 60 of the sleeve 51, a bushing or sleeve 95 is utilized. Sleeve 95 is prepared for the particular group of workpieces being run under control of its own particular arbitrarily chosen standard. The bushing 95 has an axial bore 96 therethrough. The bushing is engaged concentrically with the reduced diameter portion $39^1$ of the workpiece $35^1$ prior to the engagement of the workpiece $35^1$ which the comparator 50. The sleeve 95 has an end surface 97 which abuts with the precision surface 60 of the comparator sleeve 51. Surface 97 is ground on the bushing 95 to assure that the axis of the workpiece $35^1$ is aligned with the axis of the sensing rod 53. Ideally, the workpiece end surface $42^1$ and bushing surface 97 should be coplabar; however, the bushing may be slightly longer than the length of the reduced diameter portion 39 such that end surface 42¹ of the workpiece is slightly spaced from, but is parallel to, the comparator mating surface 60. In this case, the comparator still functions properly but senses an apparent, rather than real, depth of the center hole in surface 42¹.

The comparator 50 of this invention may be utilized in an inspection operation wherein bench centers 110 and 111 are used. (See FIGURE 8.) The bench centers, for example, may be mounted in head and tail stocks 112 and 113, respectively, illustrated in FIGURE 1. stocks 112 and 113 are mounted to a base 114. The difference in this case is that the base 114 is mounted on transverse slides 115 and 116 on an examining workbench, not upon the carriage of a machine tool. The bench center installation may further include a jig or template 118 having an outline conforming to a selected cross-section of a completely finished workpiece 120. The normal method of operating such an inspection installation is to engage each workpiece 120 between the bench centers 110 and 111 and then engage the template 118 with the workpiece to check fit and clearance of the workpiece relative to the template. In many cases the character of the engagement between the template and the workpiece is presented on the screen of a conventional optical comparator. The screen of an optical comparator is not illustrated in the accompanying drawings since it forms no part of the present invention and since the manner of use of an optical comparator is considered within the talents of a worker skilled in the use of machine tools or inspection equipment. When an optical comparator is used, it is normal to have the jig fixed and to mount the workpiece between the bench centers in a manner such that the workpiece and centers may be moved laterally as a unit into engagement with the jig. Slides 115 and 116 permit such lateral movement. This practice may not be utilized with the workpiece unless the workpiece is first positioned exactly opposite the jig.

As was explained in conjunction with the comparator 50, there are often considerable variations in the depths of the center holes of the various workpieces in particular production run. If the bench centers 110 and 111 were fixed relative to the jig 118, or if at least one of the bench centers were fixed, this variation in center hole depth would result in misalignment of the workpiece 120 relative to the comparison jig 118. When such a misalignment occurs, engagement between the jig and the workpiece will result in destruction of either the finely machined outline of the jig, or the precision machined surface of the workpiece, or both.

The comparator 50 may be utilized in conjunction with an inspection installation wherein one of the conically tipped bench centers 110 is fixed relative to its supporting pedestal 112, but wherein the pedestal 112 is movable on slide 122 in a plane parallel to the axis of its center. The other center 111 of the pair of bench centers is resiliently mounted relative to its supporting pedestal 113 in a maner similar to that illustrated in FIGURE 1 for center 26.

The second surface gauge 85 associated with the comparator 50 of this invention is engaged with its plunger abutting the movable pedestal 112 which mounts the fixed bench center 110. The axis of the plunger is aligned to be parallel to the plane of motion of its adjacent pedestal The operation of the comparator 50 then proceeds according to the method of operation described above. The position of the bench center 110 is varied about a zero position in accord with indications obtained from the comparator 50. Utilizing the comparator in this manner assures that each workpiece will be properly aligned relative to the comparison jig 118 so that no damage to either the jig or the workpiece will occur. Furthmore, pre-alignment afforded by the use of the comparator 50 results in a considerably accelerated examination and inspection procedure.

Where the comparator of this invention is used it is impossible to ruin a workpiece and to cause the workpiece to scrapped. If any dirt or foreign material contaminates the center hole of the workpiece, such dirt will, in effect, make the center hole smaller such that the workpiece will be ground oversize. An oversize workpiece is reworkable. The same feature applies to any foreign matter which may accumulate on the conical end of the sensing rod of the comparator. This feature relieves the operator of the machine tool of the heavy responsibility associated with the production of expensive parts. As a result, the production of parts is increased substantially. The foregoing description and explanation of this invention has been by way of example and is not to be considered as a limitation to the scope of this invention.

I claim:

1. A center-hole comparator for use with machine tools having a pair of spaced apart coaxially oriented centers for supporting a workpiece during an operation on the workpiece by the machine tool, the comparator comprising
    (a) a sleeve defining a vertical bore therethrough,
        a rod disposed within the bore in close slidable fit relative to the sleeve,
            the lower end of the rod having a fluted conical tip defined thereon, the interior angle of the cone corresponding to the cone of a standard center hole,
    (b) said sleeve including rod guide and workpiece abutting means at the lower end of the sleeve engaged within the flutes of the rod
        whereby the lower end of the rod is dependable below said means, and
    (c) a precision distance measuring means operatively coupled to the rod and operable in response to movement of the rod to indicate deviation of the rod tip from a standard location thereof and to indicate the direction in which the rod is disposed relative to the standard location.

2. Apparatus for gauging the depth of a center hole in a workpiece comprising:
    (a) a sleeve having a vertical bore therethrough and a lower end defining a planar surface perpendicular to the axis of the bore,
    (b) a sensing rod slidably engaged within the bore and having a lower end defining a conical point, the lower end of the sensing rod including a plurality of concave flutes disposed axially of the rod and extending partially along the length thereof,
    (c) a corresponding plurality of rod guide means disposed in the lower end of the sleeve and engaged within the flutes, each guide means having a downwardly exposed surface coplanar with the lower end surface of the sleeve,
    (d) a distance measuring means mounted adjacent the upper end of the sleeve,
    (e) a pivotable lever mounted to the upper end of the sleeve, the lever having a pair of substantially equal length arms extending in opposite directions from the pivot of the lever,
    the end of one arm being engaged with the upper end of the sensing rod and the other arm being engaged with the distance measuring means for operation thereof:
    whereby the distance measuring means senses the absolute value of the displacement of the sensing rod.

3. Apparatus for gauging the depth of a center hole in a workpiece comprising:
    (a) a sleeve having a vertical bore therethrough, the lower end of the sleeve defining a planar surface perpendicular to the axis of the bore, (b) a sensing rod slidably engaged within the bore, the lower end of the rod defining a conical point and having a plurality of concave flutes disposed axially of the sensing rod and extending partially along the length thereof,
(c) a corresponding plurality of rod guide means disposed in the lower end of the sleeve and engaged within the flutes, each guide means having a downwardly exposed surface coplanar with the lower end surface of the sleeve, and
(d) distance measuring means mounted to the sleeve and operable in response to the position of the sensing rod, whereby the distance measuring means senses and indicates the value of the displacement of the sensing rod.

References Cited by the Examiner

UNITED STATES PATENTS

| | | | |
|---|---|---|---|
| 490,860 | 2/93 | Snoeck | 33—169 |
| 1,459,896 | 6/23 | John | 33—169 |
| 1,923,020 | 8/33 | Fox | 51—281 |
| 2,128,215 | 8/38 | Walker | 33—169 |
| 2,190,961 | 2/40 | Webber | 33—172 |
| 2,480,891 | 9/49 | VanWinkle | 33—172 |
| 2,600,498 | 6/52 | Hamerly | 33—172 |
| 2,602,235 | 7/52 | Dow | 33—172 |
| 2,632,955 | 3/53 | Samuelson | 33—169 |
| 2,922,264 | 1/60 | Mushrush | 51—281 |

ISAAC LISANN, *Primary Examiner.*

LESTER M. SWINGLE, *Examiner.*